United States Patent

Schoo et al.

(10) Patent No.: US 7,826,389 B2
(45) Date of Patent: Nov. 2, 2010

(54) COMMUNICATIONS METHOD

(75) Inventors: Karsten Schoo, Dortmund (DE); Janne Tervonen, Espoo (FI)

(73) Assignee: Nokia Corporation, Espoo (FI)

( * ) Notice: Subject to any disclaimer, the term of this patent is extended or adjusted under 35 U.S.C. 154(b) by 454 days.

(21) Appl. No.: 11/672,479

(22) Filed: Feb. 7, 2007

(65) Prior Publication Data

US 2008/0186867 A1 Aug. 7, 2008

(51) Int. Cl.
H04L 12/26 (2006.01)

(52) U.S. Cl. ...................................... 370/252
(58) Field of Classification Search ................. 370/252
See application file for complete search history.

(56) References Cited

U.S. PATENT DOCUMENTS

| 6,400,773 | B1 * | 6/2002 | Krongold et al. ............ 375/260 |
| 2002/0187786 | A1 | 12/2002 | Takano | |
| 2003/0203741 | A1 | 10/2003 | Matsuo | |
| 2005/0237992 | A1 * | 10/2005 | Mishra et al. ............... 370/349 |
| 2007/0014273 | A1 * | 1/2007 | Kuperschmidt et al. ..... 370/347 |

FOREIGN PATENT DOCUMENTS

| EP | 1227626 A | | 7/2002 |
| EP | 1641302 A | | 3/2006 |
| GB | 2 345 612 A | | 7/2000 |
| WO | WO 02/49305 | * | 6/2002 |
| WO | WO 2006/020800 | * | 2/2006 |

OTHER PUBLICATIONS

International Search Report for PCT Patent Application No. PCT/EP2008/050616.

* cited by examiner

Primary Examiner—Melvin Marcelo
(74) Attorney, Agent, or Firm—AlbertDhand LLP

(57) ABSTRACT

A method comprising determining information for the performance of a channel and sending the determined information to a transmitter is disclosed. The determined information can be sent to the transmitter with acknowledgement data. The determined information can include, for example, data rate and/or transmit power. The acknowledgement data can be sent in an acknowledgement frame, such as a block acknowledgement frame or immediate acknowledgement frame. The determined information can be sent in the payload of the frame. The frame can, for example, be a kink feedback frame associated only with a particular transmitter and receiver. A characteristic of the channel, such as signal and interference to noise ratio, can also be determined.

15 Claims, 3 Drawing Sheets

FIG. 1

| bits: b7-b4 | bits: b3-b0 |
|---|---|
| Data Rate | Power Transmit Level Change |

FIG. 2

| octets: 1 | 1 | 3 | | 3 |
|---|---|---|---|---|
| Element ID | Length (=3xN) | Link 1 | | Link N |

FIG. 3

| bits: b23-b20 | b19-b16 | b15-b0 |
|---|---|---|
| Data Rate | Transmit Power Level Change | DevAddr |

FIG. 4

| Value | Power level change |
|---|---|
| 1000 - 1101 | Reserved |
| 1110 | -2 |
| 1111 | -1 |
| 0000 | no change |
| 0001 | +1 |
| 0010 | +2 |
| 0011 - 0111 | Reserved |

| Value | Data Rate (Mbit/s) |
|---|---|
| 0 | 53.3 |
| 1 | 80 |
| 2 | 106.7 |
| 3 | 160 |
| 4 | 200 |
| 5 | 320 |
| 6 | 400 |
| 7 | 480 |
| 8 -15 | Reserved |

| octets: 2 | 1 | 1 | 2 | 0-n |
|---|---|---|---|---|
| Buffer Size | Frame Count | Reserved | Sequence Control | Frame Bitmap |

COMMUNICATIONS METHOD

FIELD OF THE INVENTION

The present invention relates to a method, a receiver and a computer program.

BACKGROUND OF THE INVENTION

A communication system can be seen as a facility that enables communication sessions between two or more entities such as communication devices, network entities and other nodes. A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit data via the communication system and can thus be used for accessing various applications. A communication device may also enable an unmanned entity such as an application to exploit the communication capabilities of the device.

A communication system typically operates in accordance with a given standard or specification which sets out what the various entities associated with the system are permitted to do and how that should be achieved. For example, the standard or specification may define if a communication device is provided with a circuit switched carrier service or a packet switched carrier service or both. Communication protocols and/or parameters which shall be used for the connection are also typically defined. For example, the manner how a communication device can access a communication system and how various aspects of the communication there between shall be implemented is typically based on predefined communication protocols.

Various communication systems providing wireless communication are known. These systems are often referred to as mobile systems; although in certain systems the mobility may be restricted to substantially small areas. A mobile communication device that is configured for duplex communication is typically provided with a transceiver for enabling wireless communication with a base station or a receiver of the wireless system. An example of the wireless systems is the public land mobile network (PLMN). Another example is a wireless system that is based, at least partially, on use of communication satellites. Wireless communications may also be provided by means of other types of systems, such as by means of wireless local area networks (WLAN) or short range radio or other wireless links.

An example of the short range or local systems are wireless personal area networks (WPANs) where the connections involve little or no infrastructure but are rather based on groups of communicating devices or stations. Thus, in a simple form a wireless communication system comprises at least two stations that are suitably configured for enabling wireless communication there between.

Local communication system such as short range communication systems may also be configured to provide high data rates. High data rates may be enabled by means of mechanism such as ultra-wide band (UWB) signalling. For various reasons, for example due to emission limits imposed by regulatory bodies, coverage radius for those systems may be limited, typically to a few meters, for example ten metres.

The local system may be connected to other networks, for example a data network and/or a telecommunication network, via an appropriate gateway arrangement.

A number of new applications may be made possible in local wireless systems, for example those employing the UWB, if the coverage radius thereof is extended. Different physical layer (PHY) modes have different operating ranges and bit rates. Extended coverage may be possible within emission masks for example by using lower bit-rate, more error-protected physical layer (PHY) modes. Such range extension, however, may impose new constraints on the system design.

One example of a wireless personal network is described in the ECMA international, Standard ECMA-368, *High Rate Ultra Wideband PHY and MAC Standard*, $1^{st}$ Edition, December 2005. This standard specifies an ultra wide band UWB physical layer PHY for wireless PANs, utililising the 3100-10600 MHz frequency band. This is also approved as ISO/IEC 26907.

However, the PAN channel is inherently dynamic. The dynamics are caused by moving devices, the moving human body as well as obstacles crossing the line of sight. Typically requirements in terms of data rate and real time performance are constantly increasing. However, the dynamic channel disrupts the signal. To improve the performance of a dynamic channel, the modulation and coding scheme as well as the transmit power could be changed in dependence on the channel state information. To achieve this would require that the current channel state be obtained. Further, the optimum data rate and transmit power needs to be derived and this information has to be fed back to the transmitter.

In the ECMA-368 document, the possibility to feedback the optimal data rate in a beacon by a link feedback information element is disclosed. However, there is a problem in that the beacons are only sent every 65.536 ms, which is too seldom for accurate adaptation. Thus, optimum performance can not be achieved with the current proposals.

Furthermore in the arrangement discussed in ECMA-368, the signal is either not adapted to the channel characteristics or it is adapted using a link feedback information element (IE), which is transmitted in the beacon. The link feedback information element contains a link field for each link with length of three bytes. Two bytes are used for the device address, whereas one byte is used for the data rate and transmit power level change. Four bits are reserved for each part.

There is no disclosure in the ECMA-368 document on how to obtain the optimum data rate or transmit power level.

One or more embodiments of the invention aim to address or mitigate one or several of the above problems.

SUMMARY OF THE INVENTION

There is provided according to the invention a method comprising: determining information for the performance of a channel; sending said determined information to a transmitter, said determined information being sent to said transmitter with acknowledgement data.

The method may comprise determining at least one characteristic of a channel.

The at least one channel characteristic may comprise signal and interference to noise ratio.

The method may comprise determining an average of said at least one characteristic of a channel.

The method may comprise determining an average of said at least one characteristic using only some of a plurality of symbols transmitted on said channel.

Determining said information is preferably dependent on at least one characteristic of a channel.

Determining information for the performance of a channel may comprise looking in a look up table for said information in dependence on a value of said at least one characteristic of said channel.

The method may comprise determining in a receiver said information for performance of a channel.

Determining information for the performance of a channel may comprise information for at least one of data rate and transmit power.

The method may comprise sending said determined information to said transmitter in an acknowledgement frame.

The acknowledgment frame is preferably a block acknowledgement frame.

The acknowledgement frame is preferably an immediate acknowledgement frame.

The method may comprise sending said determined information in a payload of a frame.

According to a second aspect of the invention there is provided a method comprising: determining information in a receiver for the performance of a channel; sending said determined information to a transmitter, said determined information being sent to said transmitter in a frame associated only with said receiver and said transmitter.

The frame may comprise a link feedback frame.

According to a third aspect of the invention there is provided a receiver comprising: a processor configured to determine information for the performance of a channel; and a transmitter configured to transmit said determined information to a transmitter, said determined information being sent to said transmitter with acknowledgement data.

The transmitter is preferably configured to send said determined information to said transmitter in an acknowledgement frame.

The acknowledgment frame is preferably a block acknowledgement frame.

The acknowledgement frame is preferably an immediate acknowledgement frame.

The transmitter is preferably configured to send said determined information in a payload of a frame.

The information for the performance of a channel may comprise information for at least one of data rate and transmit power.

According to a fourth aspect of the invention there is provided a receiver comprising: means for determining information for the performance of a channel; and means for sending said determined information to a transmitter, said determined information being sent to said transmitter with acknowledgement data.

According to a fifth aspect of the invention there is provided a computer readable medium having computer executable components comprising: a first computer executable component which when executed causes information for the performance of a channel to be implemented; a second computer executable component which when executed causes said determined information to be combined with acknowledgement data.

BRIEF DESCRIPTION OF FIGURES

For better understanding of the present invention, reference will now be made by way of example only to the accompanying drawings in which:

FIG. 1 shows usage of a reserved byte in embodiments of the invention;

FIG. 2 shows link feedback information elements;

FIG. 3 shows a link field format;

FIG. 4 shows transmit power level change field encoding;

DETAILED DESCRIPTION OF EMBODIMENTS OF THE INVENTION

An exemplifying communication system wherein the invention can be embodied is now briefly explained with reference to the topology shown in FIG. 7. The communication system may be provided by a plurality of devices that may communicate with each other via wireless interfaces. An example of a wireless system is a wireless personal area network (WPAN) where the wireless connections involve little or no infrastructure but are rather based on groups of communicating devices. Thus no particular control entities may be needed and are not shown.

Figure 8:
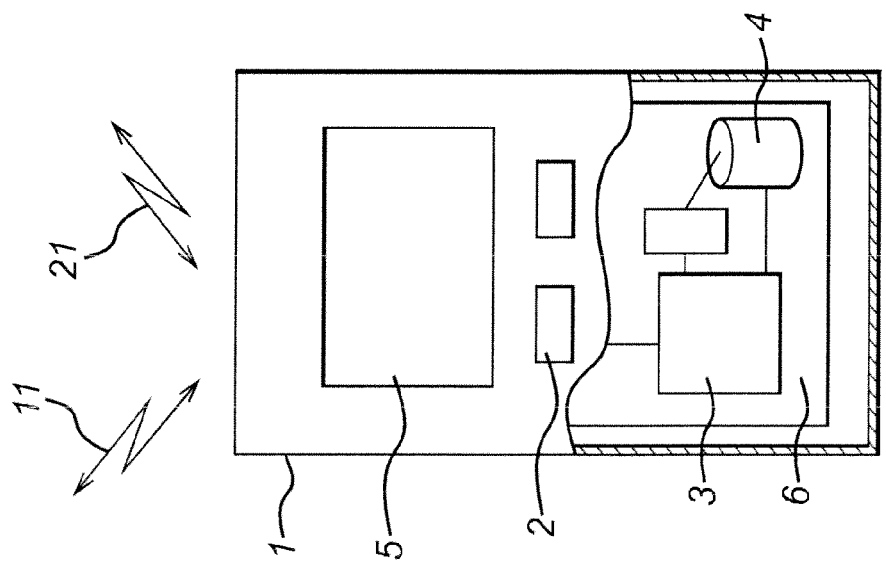
FIG. 8 shows a schematic representation of a possible device for use in the system of FIG. 7.

In summary there are a plurality of devices 30 each of which are capable of transmitting and receiving. Each device is capable of communicating with any one or more other devices 30 in range. In FIG. 7, the possible communication channels between devices are shown in dotted lines. One or more of the devices may be a portable or mobile wireless communication device, an example of which is shown in FIG. 8. One or more of the devices may be a stationary or fixed wireless communication device Before explaining in detail some exemplifying embodiments, certain general principles of a portable or mobile wireless communication device are also briefly explained with reference to FIG. 8. A portable wireless communication device can be used for communication with other devices via a wireless or radio interface. The other station may be a similar wireless transmitter and/or receiver node, another portable wireless communication device or other type of a station. Each portable wireless device may have one or more radio channels open at the same time and may have communication connections with more than one other station. A mobile wireless device is typically able to move.

FIG. 8 shows a schematic partially sectioned view of such a mobile wireless device 1. The mobile device 1 of FIG. 8 can be used for various tasks such as making and receiving phone calls, for receiving and sending data from at least other devices in a group of devices. Non-limiting examples of appropriate devices include a mobile station (MS), a portable computer provided with a wireless interface card or other wireless interface facility, personal data assistant (PDA) provided with wireless communication capabilities, or any combinations of these or the like. Further examples include control devices, for example mouses and other pointers and/or actuators; audio devices, for example microphones, earphones, and loudspeakers; video devices, for example videocameras and monitors, or any combination of these or the like.

The connection to other devices may be based on any appropriate mechanism. For example, the wireless device 1 may communicate over short range radio links such as those based on WiMedia UWB standards, Bluetooth™ protocols, Wibree, ECMA-368 and so forth. An appropriate wireless communication device is provided with required radio transmission elements and controller functions so that it is enabled to communicate wirelessly, and process control instructions it may receive and/or send. The communication occurs via an appropriate radio interface arrangement of the mobile device, typically an antenna element. The antenna may be arranged internally or externally to the device. A wireless communication device is typically also provided with at least one data processing entity 3 and at least one memory 4 for use in tasks it is designed to perform. The data processing and storage entities can be provided on an appropriate circuit board and/or in chipsets. This feature is denoted by reference 6.

The user may control the operation of the device 1 by means of a suitable user interface such as key pad 2, voice commands, touch sensitive screen or pad, combinations thereof or the like. A display 5, a speaker and a microphone are also typically provided. Furthermore, a wireless device may comprise appropriate connectors (either wired or wireless) to other devices and/or for connecting external devices, for example hands-free equipment, thereto.

The mobile device 1 may be enabled to communicate with a number of different other devices. This is illustrated schematically in FIG. 8 by the two wireless signals 11 and 21.

The wireless device or station of FIG. 8 may be configured to join a group of short range devices and to communicate beaconing information to other devices in the group. In the examples described herein the beaconing information is included in data entities provided by beacon frames. Additionally, the wireless device is able to send and/or receive blocks of frames of data.

Embodiments of the invention can provide link feedback and link adaptation in the high rate ultra wideband PHY and MAC standard [ECMA-368] or the like. As discussed previously, this is a standard for short range communications between wireless devices that may establish a personal area network (PAN). Embodiments of the invention can be applied in alternative PAN contexts or indeed any other wireless communications environment.

Figure 9:
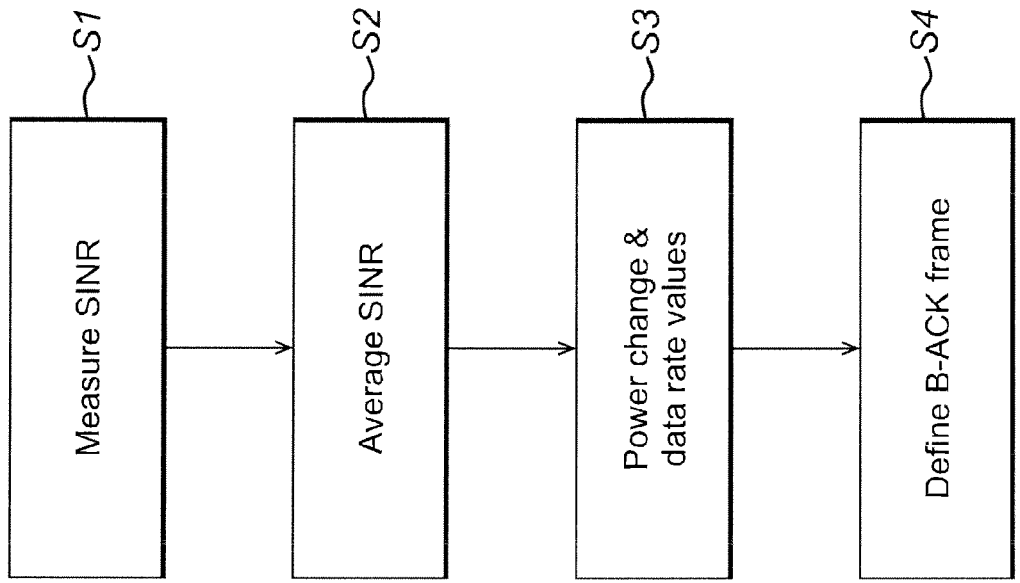
FIG. 9 shows a flow diagram of a method embodying the present invention.

A scheme for link adaptation in ECMA-368 embodying the present invention will now be described, with reference to the flow diagram of FIG. 9. First, in step S1, the signal to interference-plus-noise ratio (SINR) has to be measured for each utilized band within the utilized band group. This is done in a receiver for the band or bands received from a particular transmitter. In current ECMA-368 proposals, there are 14 bands, each with a bandwidth of 528 MHz. The first 12 bands are grouped into 4 band groups each group comprising 3 bands. The last two are grouped into a fifth band group. The ECMA standard uses Multi-band Orthogonal Frequency Division Modulation (MB-OFDM) scheme to transmit information. Seven channels are supported in band group 1-4; two channels are supported in band group 5. In embodiments of the invention, one of the band groups, which is used, is considered. For the considered band group, the SINR of the utilized bands needs to be taken into account. Due to frequency hopping, the usage of bands depends on the selected logical channel. If frequency hopping is enabled the system hops to another band after every OFDM symbol.

Band groups 1-4 in theory support seven channels and band group 5 two. However, for example on band group 1, the first four channels (TFCs 1 to 4) use frequency hopping, but the last three are static in terms of frequency (no hopping). Not all the seven channels can be used simultaneously due to interference. Each device is operating on one of these channels. Thus, the device can measure the SINR of that channel, if for example in the middle of active data transfer.

In step S2, the overall SINR is obtained. Different frequency bands typically show different characteristics—amongst others—in terms of signal strength, noise and interference. In the case of frequency hopping the overall SINR can be obtained by averaging over the three utilized bands. To take all three bands into account, it is sufficient in some embodiments of the invention to average over every second OFDM symbol instead over six consecutive OFDM symbols. In the ECMA proposal, the hopping sequence has a length of six. In the table below, the five band groups are identified. The associated bands are also identified. Thus band group 1 comprises bands 1, 2 and 3 and so on. This is done in the receiver.

| BAND GROUP | BAND IDENTITY |
|---|---|
| 1 | 1 |
| 1 | 2 |
| 1 | 3 |
| 2 | 4 |
| 2 | 5 |
| 2 | 6 |
| 3 | 7 |
| 3 | 8 |
| 3 | 9 |
| 4 | 10 |
| 4 | 11 |
| 4 | 12 |
| 5 | 13 |
| 5 | 14 |

In the ECMA standard, unique logic channels are specified using up to seven different time-frequency codes TFC for each band group. The table below gives as an example the TFCs and associated base sequences for band group 1, as a function of the band ID values.

| TFC number | Base Sequence | 1 (Band ID) | 2 (Band ID) | 3 (Band ID) | 4 (Band ID) | 5 (Band ID) | 6 (Band ID) |
|---|---|---|---|---|---|---|---|
| 1 | 1 | 1 | 2 | 3 | 1 | 2 | 3 |
| 2 | 2 | 1 | 3 | 2 | 1 | 3 | 2 |
| 3 | 3 | 1 | 1 | 2 | 2 | 3 | 3 |
| 4 | 4 | 1 | 1 | 3 | 3 | 2 | 2 |
| 5 | 5 | 1 | 1 | 1 | 1 | 1 | 1 |
| 6 | 6 | 2 | 2 | 2 | 2 | 2 | 2 |
| 7 | 7 | 3 | 3 | 3 | 3 | 3 | 3 |

Similar tables can be used for the other band groups. In one embodiment of the invention, say sequence 1 is used, then the SINR may be averaged over every second OFDM symbol used, that is band 1, then band 3, then band 2. As the bands are hopped through in a specific order, it is sufficient to average over every second OFDM symbol only. Of course every symbol may be considered in some embodiments of the invention. It may even be possible to consider less than 1 in 2 symbols in some embodiments of the invention. In case of TFCs 5-7 no frequency hopping is applied and thus, only the SINR of one band needs to be considered. However, averaging can be done over every second OFDM symbol as described above, all symbols or any other subset of OFDM symbols.

Step S3 will now be described. The optimum data rate depends on the application and it can be optimized for throughput, packet error rate (PER) etc. Different optimizations can be obtained from simulations and data from these simulations is stored in look-up tables. The optimum data rate is mapped onto an integer. In this regard reference is made to FIG. 5. In this table the first column represents the value which is inserted into a frame, as will be described in more detail hereinafter. The second column represents the data rate in Mbits/s represented by the value. Thus, the SINR average value is used to look up a corresponding data rate. The value associated with the data rate is then inserted into the frame. For example if a data rate of 320 Mbits/s is determined to be appropriate given the SINR, then the value 5 is inserted into the frame. It should be appreciated that the look up table may provide the value 5 directly or may provide the data rate itself. The data rate, in the latter case may be provided and from that the associated value is determined from another look up table or by applying rules to the determined appropriate data rate.

A transmit power lever change field value is determined in a similar way. In this regard, reference is made to FIG. 4 which shows the value in the value column which is inserted to a frame. The power level change column shows the associated action. For example, for value 1111, the action would be to decrease the power by 1 steps. Thus FIG. 4 shows how the transmit power change is encoded. This value is determined in the same way as described in relation to the data rate, that is by using the SINR value to look up the associated power change value, either directly or indirectly.

In one embodiment, a single look up table is provided which for a given SINR will provide both the data rate value and the transmit power change value to be inserted into the appropriate locations in the frame. In the alternative, separate look up tables can be provided, one for the data rate value and one for the transmit power level change value.

Figures 5, 6, 7:
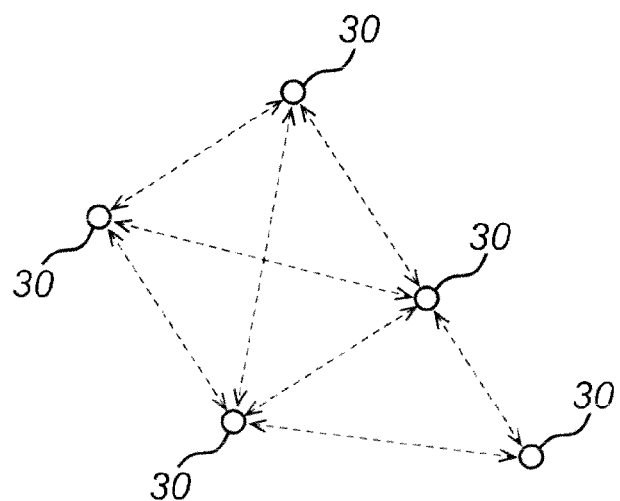
FIG. 5 shows the data rate field.
FIG. 6 shows the payload format for B-ACK (Block acknowledgment)
FIG. 7 shows a schematic representation of a communication system in which embodiments of the invention may be embodied

In step S4, the recommended Data Rate and the Transmit Power Level Change shall be fed back in the reserved byte of the payload of a B-ACK frame which is shown in FIG. 6. The B-ACK frame is generally provided to acknowledge the correct or incorrect receipt of a previous sequence of frames from the particular transmitter and provides information for the transmission of the next sequence of frames by that particular transmitter. Generally the addressed recipient, that is the receiver, will keep track of received frames until requested to respond with a B-ACK frame. The B-ACK mechanism allows a source device to transmit multiple frames and to receive a single acknowledgement frame from the recipient indicating which frames were received correctly and which need to be retransmitted.

A source device (the transmitter) initiates the use of the B-ACK mechanism with a recipient device (the receiver) for frames either from the same stream or of the same user priority. The recipient device will indicate the maximum number and size of frames that can be buffered by the recipient device. The source device transmits all of the frames except the last one of the sequence with an ACK policy set to B-ACK. The final frame of the sequence contains a request for acknowledgement in that the ACK policy is set to B-ACK request. The recipient will send the B-ACK frame as shown in FIG. 6 to the transmitter.

The buffer size field specifies the maximum number of octets in the frame payloads of all frames in the next B-ACK sequence that can be buffered by the recipient (the receiver). The Frame count specifies the maximum number of frames in the next B-ACK sequence that can be buffered by the recipient. The Sequence control and the Frame bitmap fields together specify an acknowledgement window of MSDU (MAC service data unit) fragments and their reception status. In other words, this specifies which of the frames of the sequence have been correctly received. The sequence control field specifies the sequence number and fragment number that start the acknowledgement window.

The reserved byte used in embodiments of the present invention as shown in FIG. 1. The Data Rate field values and Power Transmit Level field values shall be used as defined in FIG. 4 and FIG. 5. In other words, these values are inserted into the reserved byte of the B-ACK frame. In one embodiment of the invention, the bits 7 to 4 of the reserved byte are used for the data rate. The bits 3 to 0 are used for the power transmit level change. This embodiment ensures prompt feedback of the optimum data rate and the transmit power change without necessarily requiring the standard to change.

In this regard, embodiments of the invention can be contrasted with the link feedback information element IE. In this regard, reference is made to FIGS. 2 and 3, which shows the link field formation. FIG. 2 shows the Link feedback IE which contains information on the recommended change to the data rate and transmit power lever by a recipient device for one or more source devices. The line feedback IE is illustrated in FIG. 2 and contains an element identity and N link fields. The format of the N link fields are shown in FIG. 3. Each link field comprises not only the transmit power data and the data rate information but also the source device address for which the feedback is provided. This information shown in FIGS. 2 and 3 are transmitted in beacons or beacon frames.

Embodiments of the invention are advantageous over the arrangement described in relation to FIGS. 2 and 3 in that the additional fields in the link feedback IE are not required, with the B-ACK already belonging to a specific link between a source and destination device.

The information in the reserved byte in some embodiments of the invention only contains a recommendation and transmitting devices can decide whether to use it or not.

Additionally or alternatively, the link feedback information can be added to Immediate acknowledge frames, if the structure of the Immediate acknowledge frames is be changed in MAC standardization in future so as to include a field in which the information mentioned above can be included. Immediate acknowledge Imm-ACK frames are used to acknowledge immediately a single frame. Currently, Imm-ACK packets do not have a frame payload. The Imm-ACK may be modified to provide a frame payload of for example one byte. The one byte field may be as described in relation to FIG. 1 containing the data rate information and the power level change information.

Another possibility is to define a specific Link Feedback command frame to carry the link feedback information from the receiver to the sender. Adding a new command frame into the specification may require:
1) defining of a new Frame Subtype for Link Feedback command frame (e.g. 6, the first reserved value)
2) defining the command frame payload; at least one byte is needed, for example as shown in FIG. 1.

The Link Feedback command frame would be sent from the receiver (or receivers in the case of multicast) to the transmitter.

Also, it is possible to use e.g. Application-specific command frame container for this purpose. This latter option wouldn't require any changes in MAC specification. For the application-specific command frame, the payload could be similar to that for Link Feedback command frame.

Embodiments of the invention may provide a higher throughput, lower PER packet error rate, etc. Simulations indicate that by using this scheme the throughput can be increased significantly or PER can be decreased compared to non-adaptive schemes.

Due to dynamics of the channel changing more quickly than the transmission of beacons (every ~65 ms), some embodiments may outperform adaptive schemes using link feedback based on the beacon. Several factors affect to the interval of two consecutive B-ACKs: availability of the radio resources, the length of data frames the transmitter is sending, used bitrate and the number of data frames between two acknowledgements. Basically, the receiver gives the upper bound for frames it can buffer before the next B-ACK. However, if the transmitter wishes, it can request the receiver to send a B-ACK frame at any time. It is possible to request B-ACK frame after every data frame. However, in some embodiments a B-ACK is requested e.g. after every 20 or 30 data frames. Here are some examples to estimate the frequency of two consecutive B-ACKs:

As a minimum: for a data frame size of for example, 10 bytes, 480 Mbit/s is used, and the transmitter request B-ACK immediately after one data frame, this leads to an interval between two consecutive B-ACKs of 41.875 microseconds.

If the frame size is 1500 bytes (which for example only is a typical maximum IP packet size according to typical transport specification), 480 Mbit/s is used. If a B-ACK is requested after one data frame, the interval between two consecutive B-ACKs is 91.875 microseconds.

In one example, the data frame comprises 10 bytes, 480 Mbit/s is used. 30 data frames are sent before a B-ACK requested. The interval between two consecutive B-ACKs would be 531.25 microseconds.

In another example, the data frame comprises 1500 bytes, 480 Mbit/s is used. 30 data frames are sent before the B-ACK is requested. The interval between two consecutive B-ACKs would be 1306.25 microseconds. As can be seen, the B-ACK mechanism means that embodiments of the invention can provide information more often than the beacon mechanism.

Moreover, if the transmit power level is adapted better to the actual channel conditions, battery power can be saved and interference to other devices can be reduced.

Furthermore embodiments of the invention can be used with the current version of the ECMA-368 standard without violating that standard. It should be appreciated that embodiments of the present invention are not limited to the context of the ECMA-368 standard and have wider application.

Embodiments of the invention can be used with WiMedia UWB radio to increase over-the-air performance. Embodiments of the invention may have application with later versions of the WiMedia PHY/MAC standard.

Preferred embodiments of the invention have been described in the context of an arrangement which is arranged to use look up tables. In an alternative embodiment of the invention, an algorithm or calculation may be performed in order to obtain the desired result.

The preferred embodiments of the invention have measured the SINR of the band(s) occupied by the utilized TFC. It should be appreciated that embodiments of the invention may measure or determine any other suitable parameter of used bands.

In preferred embodiments of the invention the determination as to the channel characteristics is performed in the receiver and the associated transmit power level change value and data rate value are also determined in the receiver. However, it should be appreciated that the transmit power level change and data rate values may be determined in a further separate entity such as a control entity or the like. That further entity would receive information from the receiver on the channel characteristics.

In the preferred embodiments of the invention, information on the data rate and the power level change is included in the B-ACK frame. In alternative embodiments of the invention, only one of these may be used. In alternative embodiments of the invention, additional or alternative parameters can be controlled such as the modulation used and/or the encoding or any other suitable parameter. In one alternative embodiment of the invention, instead of including information defining by how much the transmit power should change, the actual transmit power level to be used is included. This may require the transmitter to provide information to the receiver on the power which the transmitter has used to transmit to the receiver.

It should be appreciated that at least some of the steps of the method described in relation may be performed by a computer program running on a processor. The look-up tables may be stored in memory. According embodiments of the invention also comprise a computer program which may be provided on a storage medium such as a memory of the device or on a medium such as a disc or the like. The computer program may comprise computer executable elements which are arranged to carry out one or more of the steps of the method.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   determining, by a first node, at least one characteristic of a channel between said first node and a second node in a communication network, wherein
      an orthogonal frequency division multiplexing (OFDM) scheme is used for transmissions over said channel; and
      an average of said at least one characteristic is determined by using only some of a plurality of OFDM symbols associated with a frequency band;
   determining, by said first node, information for the performance of said channel, wherein said determined information comprises at least one of data rate information and transmit power information, said determined information being dependent on said at least one characteristic of the channel;
   combining, by said first node, said determined information with acknowledgment data, said determined information being sent to said second node with said acknowledgement data.

2. A method as claimed in claim 1, wherein said at least one channel characteristic comprises signal and interference to noise ratio.

3. A method as claimed in claim 1, wherein determining information for the performance of a channel comprises looking in a look up table for said information in dependence on a value of said at least one characteristic of said channel.

4. A method as claimed in claim 1, wherein said determined information is sent to said second node in an acknowledgement frame.

5. A method as claimed in claim 4 wherein said acknowledgment frame is a block acknowledgement frame.

6. A method as claimed in claim 4, wherein said acknowledgement frame is an immediate acknowledgement frame.

7. A method as claimed in claim 1 comprising sending said determined information in a payload of a frame.

8. A method as claimed in claim 1, wherein said determined information is sent to said second node in a frame associated only with said first node and said second node.

9. A method as claimed in claim 7, wherein said frame comprises a link feedback frame.

10. An apparatus comprising:
    at least one processor and at least one memory including program code, said at least one memory and said computer program code, configured to, working with said at least one processor, cause said apparatus to:

determine at least one characteristic of a channel between said apparatus and a further apparatus, wherein
an orthogonal frequency division multiplexing (OFDM) scheme is used for transmissions over said channel; and
an average of said at least one characteristic is determined by using only some of a plurality of OFDM symbols associated with a frequency band;
determine information for the performance of the channel, wherein said determined information comprises at least one of data rate information and transmit power information, said determined information being dependent on said at least one determined characteristic of the channel;
combine said determined information with acknowledgement data; and
send said determined information to said further apparatus with said acknowledgement data.

11. The apparatus as claimed in claim 10, wherein said at least one memory and said computer program code, working with said at least one processor, is configured cause the apparatus to send said determined information to said transmitter in an acknowledgement frame.

12. The apparatus as claimed in claim 11, wherein said acknowledgment frame is a block acknowledgement frame.

13. The apparatus as claimed in claim 11, wherein said acknowledgement frame is an immediate acknowledgement frame.

14. The apparatus as claimed in claim 10, wherein said at least one memory and said computer program code, working with said at least one processor, is configured to send said determined information in a payload of a frame.

15. A computer readable medium having computer executable components comprising:
a first computer executable component which when executed by a processor causes at least one characteristic of a channel between a first and second node to be determined, wherein
an orthogonal frequency division multiplexing (OFDM) scheme is used for transmissions over said channel; and
an average of said at least one characteristic is determined by using only some of a plurality of OFDM symbols associated with a frequency band;
a second computer executable component which when executed by the processor causes information for the performance of said channel to be implemented, wherein said determined information comprises at least one of data rate information and transmit power information, said determined information being dependent on said at least one determined characteristic of said channel;
a third computer executable component which when executed by the processor causes said determined information to be combined with acknowledgement data, said determined information being sent to said second node with said acknowledgement data.

* * * * *